United States Patent
Mastrocola

(10) Patent No.: US 10,995,804 B2
(45) Date of Patent: May 4, 2021

(54) ACTUATOR WITH ROTATING ELECTROMAGNETIC CLUTCH UTILIZING INDUCTIVE COUPLING

(71) Applicant: Hamilton Sundstrand Corporation, Charlotte, NC (US)

(72) Inventor: Naison E. Mastrocola, Goshen, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 456 days.

(21) Appl. No.: 15/963,342

(22) Filed: Apr. 26, 2018

(65) Prior Publication Data

US 2019/0334427 A1 Oct. 31, 2019

(51) Int. Cl.
*F16D 27/06* (2006.01)
*H02K 7/11* (2006.01)
*H02P 15/00* (2006.01)
*F16D 27/00* (2006.01)

(52) U.S. Cl.
CPC .............. *F16D 27/06* (2013.01); *H02K 7/11* (2013.01); *H02P 15/00* (2013.01); *F16D 2027/001* (2013.01)

(58) Field of Classification Search
CPC .... F16D 2027/001; F16D 27/06; F16D 7/028; F04B 49/14
See application file for complete search history.

(56) References Cited

U.S. PATENT DOCUMENTS

| | | | |
|---|---|---|---|
| 2,284,353 A * | 5/1942 | Allen | B64C 25/24 477/11 |
| 2,883,873 A | 4/1959 | Diebold | |
| 3,613,849 A * | 10/1971 | Pape | F16D 27/06 192/90 |
| 4,329,603 A | 5/1982 | Ballard | |
| 4,559,486 A | 12/1985 | Spencer et al. | |

(Continued)

FOREIGN PATENT DOCUMENTS

| CN | 201103636 Y | 8/2008 |
|---|---|---|
| CN | 104006153 A | 8/2014 |

(Continued)

OTHER PUBLICATIONS

European Search Report for European Application No. 19171315.5, completed Aug. 29, 2019.

*Primary Examiner* — Stacey A Fluhart
(74) *Attorney, Agent, or Firm* — Carlson, Gaskey & Olds, P.C.

(57) ABSTRACT

An example electromagnetic actuator includes a drive shaft, a motor operable to rotate the drive shaft, and a load shaft coupled to an armature body. A clutch is operable to control whether the drive shaft engages the load shaft. A rotatable portion of the clutch corotates with the drive shaft and includes a field winding and a clutch body. A stationary portion of the clutch includes an exciter winding that is inductively coupled to the rotatable portion and is operable to energize the field winding. The field winding is operable, when energized, to provide a magnetic field that causes engagement or disengagement between the clutch body and an armature body. A method of operating an electromagnetic actuator is also disclosed.

16 Claims, 5 Drawing Sheets

(56) References Cited

U.S. PATENT DOCUMENTS

| | | | | |
|---|---|---|---|---|
| 5,898,249 A | * | 4/1999 | Boggs, III | ............. F16D 27/09 |
| | | | | 192/84.1 |
| 2007/0108854 A1 | | 5/2007 | Osborn et al. | |
| 2009/0065648 A1 | * | 3/2009 | Vincent | ................ B64C 13/506 |
| | | | | 244/178 |
| 2014/0345985 A1 | * | 11/2014 | Miller | .................... F16D 27/02 |
| | | | | 188/79.55 |
| 2018/0122384 A1 | * | 5/2018 | Melkote | ................ G10L 19/008 |
| 2019/0032762 A1 | * | 1/2019 | Yoshisaka | ............... F16H 48/34 |

FOREIGN PATENT DOCUMENTS

| | | | | |
|---|---|---|---|---|
| DE | 102011086053 A1 | * | 8/2012 | ............. H01R 39/42 |
| WO | 0023292 A1 | | 4/2000 | |

\* cited by examiner

ACTUATOR WITH ROTATING ELECTROMAGNETIC CLUTCH UTILIZING INDUCTIVE COUPLING

BACKGROUND

This application relates to clutches, and more particularly to an actuator that includes a rotatable electromagnetic clutch utilizing an inductive coupling.

Clutches are used to selectively couple a drive shaft to a load shaft to drive a load. A common application for a clutch is selectively coupling a vehicle engine to a transmission to transmit driving torque to wheels of the vehicle, for example.

Electromagnetic clutches utilize an electromagnetic field to cause a clutch plate to engage or disengage from an armature coupled to the load shaft. In a typical configuration, direct current (DC) is provided to an electromagnetic coil, which creates a magnetic field causing the armature to engage a clutch plate. DC is typically provided to the electromagnetic coil through brushes. Brushes are subject to wear and are therefore considered unreliable for certain applications.

SUMMARY

An example electromagnetic actuator includes a drive shaft, a motor operable to rotate the drive shaft, and a load shaft coupled to an armature body. A clutch is operable to control whether the drive shaft engages the load shaft. A rotatable portion of the clutch corotates with the drive shaft and includes a field winding and a clutch body. A stationary portion of the clutch includes an exciter winding that is inductively coupled to the rotatable portion and is operable to energize the field winding. The field winding is operable, when energized, to provide a magnetic field that causes engagement or disengagement between the clutch body and an armature body An example method of operating an electromagnetic actuator includes operating a motor to rotate a drive shaft. A field winding in a rotatable portion of an electromagnetic clutch assembly is energized through an inductive coupling between the rotatable portion and an exciter winding in a stationary portion of the electromagnetic clutch assembly. The rotatable portion corotates with the drive shaft. A magnetic field generated from the field winding urges engagement or disengagement between a clutch body of the rotatable portion and an armature body of the stationary portion that corotates with a load shaft.

An example electromagnetic actuator includes a drive shaft, a motor operable to rotate the drive shaft, a load shaft coupled to an armature body, and a clutch operable to control whether the drive shaft engages the load shaft. The clutch includes a rotatable portion having an inductive winding and a field winding. The clutch also includes a stationary portion having an exciter winding configured such that during rotation of the rotatable portion when electrical power is supplied to the exciter winding, electrical power is induced in the inductive winding and transferred to the field winding to generate a magnetic field to urge engagement or disengagement between the rotatable portion and the stationary portion.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
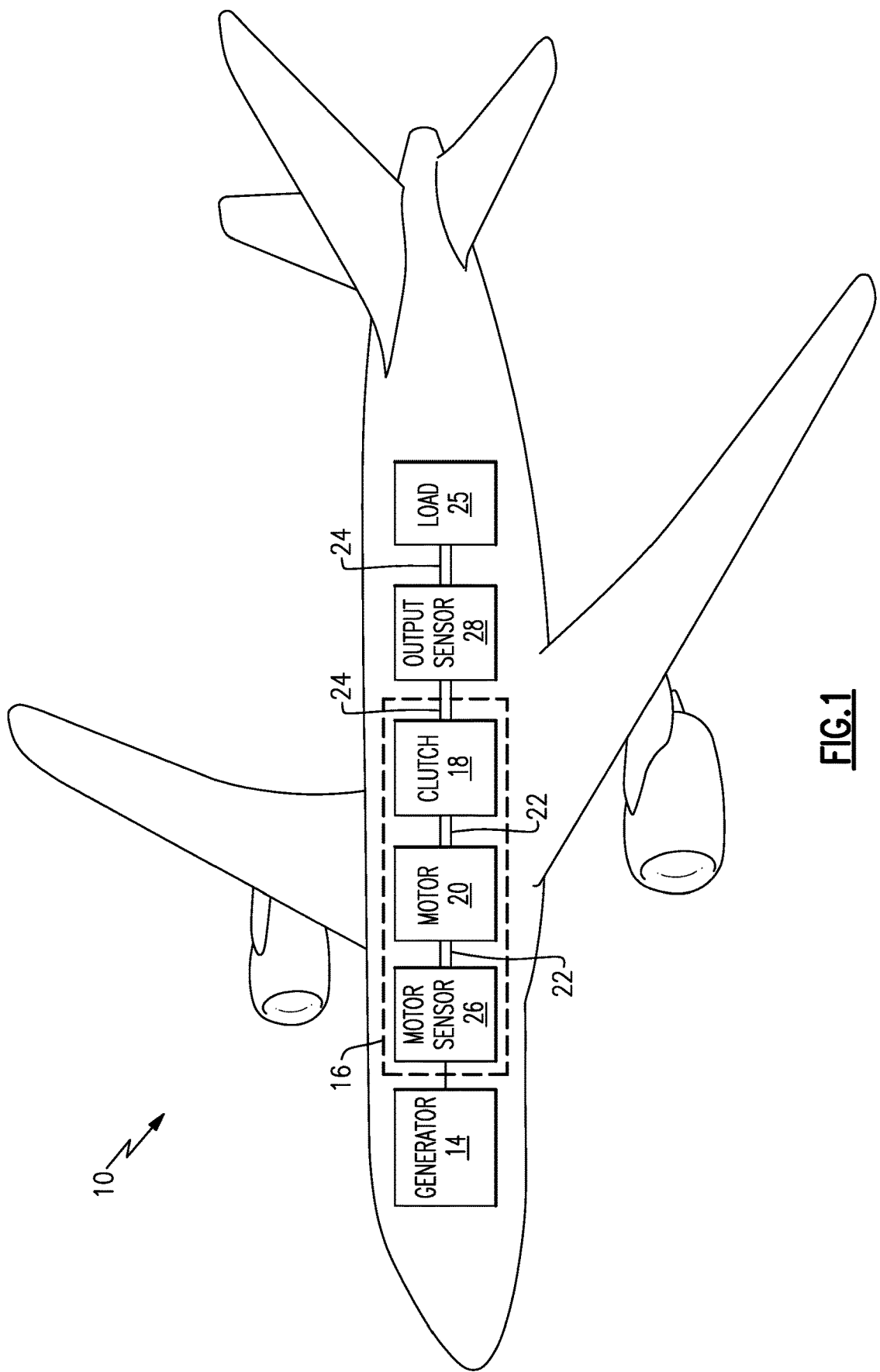
FIG. 1 is a schematic view of an aircraft that utilizes an actuator with an electromagnetic clutch.

FIG. 1 is a schematic view of an aircraft 10 that utilizes an electromagnetic actuator 16 that includes an electromagnetic clutch assembly 18. The actuator 16 also includes a motor 20 that drives rotation of a drive shaft 22. The electromagnetic clutch assembly 18 controls whether the drive shaft 22 is coupled to a load shaft 24 that drives a load 25. A motor sensor 26 is operable to determine an angular position of the motor 20 or drive shaft 22, and an output sensor 28 is operable to determine an angular position of the load shaft 24.

The electromagnetic actuator 16 could be used for a variety of aircraft 10 features, such as braking, primary flight controls (e.g., aileron control, rudder control, etc.), landing gear operation, etc.

Figure 2:
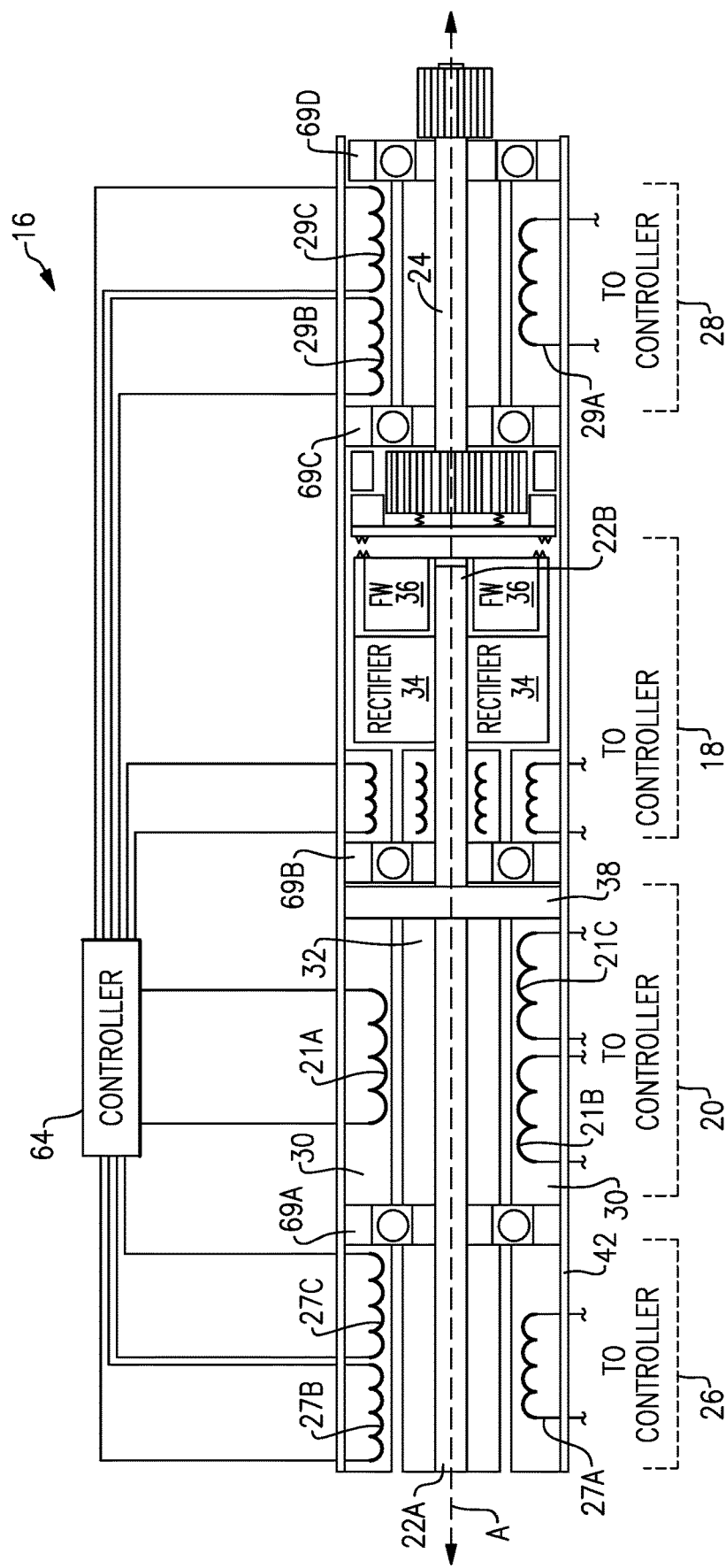
FIG. 2 is a schematic view of an example actuator that can be used in the aircraft of FIG. 1.

FIG. 2 is a schematic view of an example actuator 16 that can be used in the aircraft 10 of FIG. 1. The actuator 16 includes the electromagnetic clutch assembly 18, motor 20, motor sensor 16, and output sensor 28 shown in FIG. 1. In the example of FIG. 2, the motor sensor 26 and output sensor 28 are each resolvers. However, is understood that other types of sensors could be used.

The motor 20 includes a plurality of windings 21A-C in a stator 30. Each winding 21A-C corresponds to a phase of current. The stator windings 21A-C drive rotation of rotor 32 and drive shaft 22. A controller 64 is operable to provide current to the windings 21 for operation of the motor 20 based on a rotational position of the drive shaft 22 determined from motor sensor 26.

To determine a rotational position of the drive shaft 22 using the motor sensor 26, the controller 64 is configured to energize primary winding 27A of motor sensor 26, and read sine winding 27B and cosine winding 27C of motor sensor 26.

To determine a rotational position of the load shaft 24 using the output sensor 28, the controller 64 is similarly configured to energize primary winding 29A of output sensor 28 and read sine winding 29B and cosine winding 29C of output sensor 28.

In one example, the controller 64 energizes the windings 21A-C, 27A, and 29A utilizing alternating current (AC). The AC is provided by generator 14 in one example. In one example, the AC from the generator 14 is rectified to DC, and the controller 64 utilizes an inverter (not shown in FIG. 2) to convert that DC to AC for energizing the windings 21A-C, 27A, and 29A. Thus, although windings 21A-C, 27A-C, and 29A-C are all schematically shown as being connected to controller 64 in FIG. 2, it is understood that one or more of the windings could be connected to a component controlled by the controller 64 (such as an inverter).

An optional gear set 38 interconnects a first portion 22A and a second portion 22B of the drive shaft. The first and second portions 22A-B are coaxial and both rotate about a central longitudinal axis A.

Figure 3:
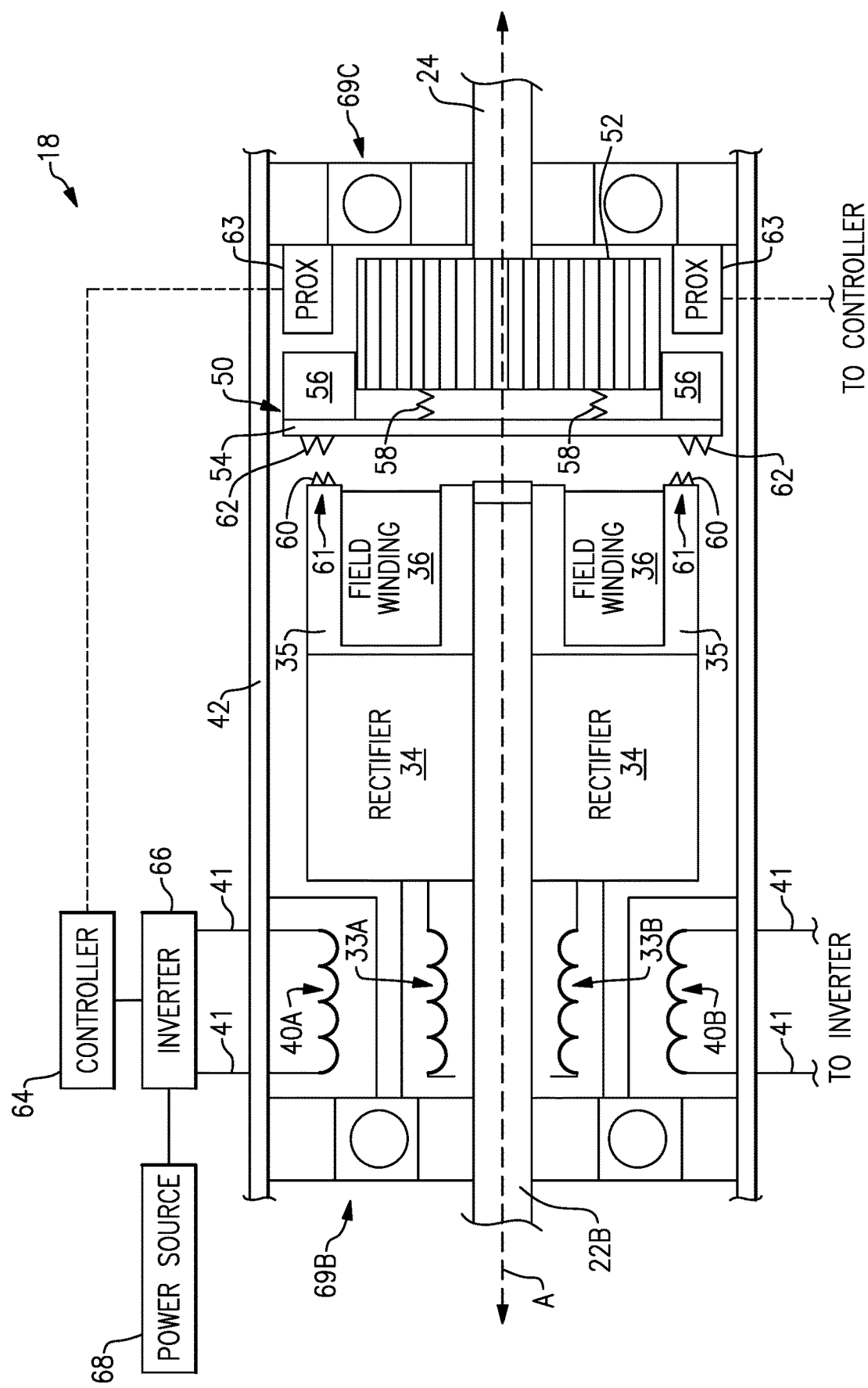
FIG. 3 is an enlarged schematic view of an electromagnetic clutch assembly of FIG. 2.

FIG. 3 is a schematic view of the example electromagnetic clutch assembly 18 of FIG. 2 in greater detail. Referring now to FIG. 3 with continued reference to FIG. 2, the electromagnetic clutch assembly 18 includes a rotatable portion and a stationary portion. The rotatable portion includes at least one inductive winding 33, a rectifier 34, a clutch body 35, and a field winding 36 that is at least partially disposed within the clutch body 35. The rotatable portion is rotatable about the central longitudinal axis A. The stationary portion includes at least one exciter winding 40 and the clutch housing 42.

The at least one exciter winding 40 is inductively coupled to the rotatable portion, and is operable to energize the field winding 36. The field winding 36, when energized, is operable to provide a magnetic field that causes engagement or disengagement between the clutch body 35 and an armature body 50.

The at least one exciter winding 40, which is stationary, and the at least one inductive winding 33, which is rotatable, are inductively coupled or "field-coupled." As used herein, two windings being "inductively coupled" means that that current in one of the windings induces a voltage in the other of the windings through electromagnetic induction. Thus, the at least one exciter winding 40 receives current from the power source 68 and induces current in the at least one inductive winding 33. This field-coupled arrangement avoids the need for brushes, and avoids the reliability issues typically associated with using brushes.

The armature body 50 is coupled to a splined hub 52. The armature body 50 and splined hub 52 corotate with the load shaft 24. The armature body 50 includes an armature plate 54 and at least one splined armature member 56 that mates with the splined hub 52. In the example of FIG. 3, the armature body 50 is movable along the central longitudinal axis A with respect to the splined hub 52 to engage or disengage from the clutch body 35.

At least one spring 58 provides a bias force to the armature plate 54. In the example of FIG. 3, the spring(s) 58 are tension springs that provides a bias force that biases the armature plate 54 away from the clutch body 35 (a "power off—disengaged" configuration). The magnetic field from the at least one field winding 36 resists the bias force and causes the armature body 50 to engage the clutch body 35.

In another example, the spring(s) 58 are compression springs that provides a bias force that biases the armature body 50 towards the clutch body 35 (a "power off—engaged" configuration), and the magnetic field from the at least one field winding 36 causes the armature body 50 to disengage from the clutch body 35.

In the example of FIG. 3, the at least one spring 58 is mounted to the splined hub 52 and the armature plate 54. In another example, the at least one spring 58 could be mounted on an opposite side of the armature plate 54, and could connect the armature plate 54 to the clutch body 35.

In the example of FIG. 3, the clutch body 35 comprises a plurality of teeth 60 on a face 61 of the clutch body 35 that are operable to engage teeth 62 of the armature body 50. In one example, instead of teeth 60 at least one of the face 61 of the clutch body 35 and the armature plate 54 have a high friction surface for engaging the face 61 with the armature plate 54. As used herein, a "high friction" surface is one having a higher coefficient of friction than the base substrate on which the high friction surface is situated (e.g., face 61 having a higher coefficient of friction than the portion of the clutch body 35 behind the face 61).

At least one proximity sensor 63 is configured to measure axial displacement of the armature body 50 along the longitudinal axis A. The controller 64 is operable to verify whether the clutch body 35 and armature body 50 are engaged or disengaged based on feedback from the at least one proximity sensor 63 and/or the output sensor 28.

The controller 64 is operable to utilize pulse width modulation (PWM) to power the at least one exciter winding 40. In particular, the controller 64 operates an inverter 66 to convert DC from a power source 68 to AC for energizing the at least one exciter winding 40 through leads 41 that extend outside of the clutch housing 42. In one example, the controller 64 operates the inverter 66 based on feedback from the at least one proximity sensor 63 (e.g., adjusting strength of the magnetic field from field winding(s) 36 based on an axial position of the armature body 50). The sensor 63 also enables the controller 64 to perform its own testing of the electromagnetic clutch assembly 18. The power source 68 could be powered by the generator 14 in FIG. 1, for example.

In one example, the same inverter 66 is used by the controller 64 to convert DC to AC for energizing the windings 21A-C, 27A, and 29A.

Bearings 69A and 69B enable rotation of the drive shaft 22 relative to the clutch housing 42, and bearings 69C and 69D similarly enable rotation of the load shaft 24 relative to the clutch housing 42.

In the example of FIG. 3, the exciter winding 40 induces alternating current (AC) in the at least one inductive winding 33. The rectifier 34 rectifies the AC and provides DC to the at least one field winding 36. In the example of FIG. 3, there are two exciter windings 40A-B that induce current on the two inductive windings 33A-B. Other quantities of windings could be used, however, such as one or more than two exciter windings 40, and one or more than two inductive windings 33, and more than one field winding 36.

Figure 4:
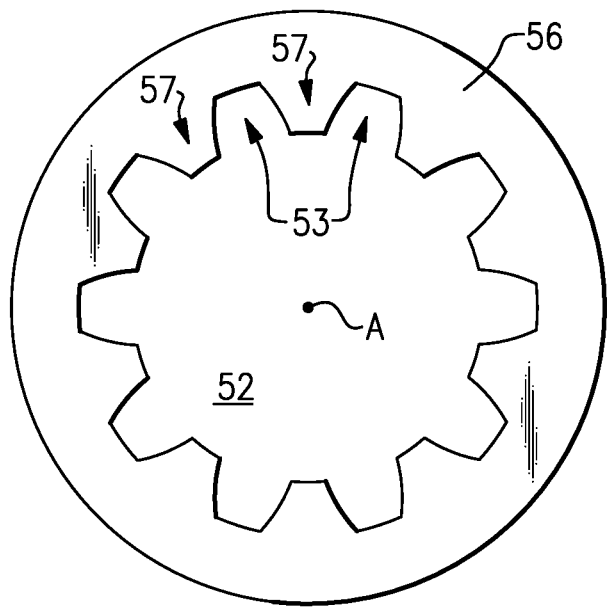
FIG. 4 is a schematic view of an interface between an armature body and a splined hub in the electromagnetic clutch assembly of FIG. 3.

FIG. 4 is a schematic view of an interface between the splined armature member 56 and the splined hub 52. Referring now to FIG. 4 with continued reference to FIG. 3, the splined hub 52 includes a plurality of splined teeth 53 disposed along an outer diameter of the splined hub 52, and the splined armature member 56 includes a plurality of splined teeth 57 disposed along an inner diameter of the splined armature member 56. The splined teeth 53 of the splined hub 52 engage the splined teeth 57 of the splined armature member 56. Both of the splined hub 52 and splined armature member 56 rotate about the central longitudinal axis A when the clutch body 35 and armature body 50 are engaged.

Figure 5:
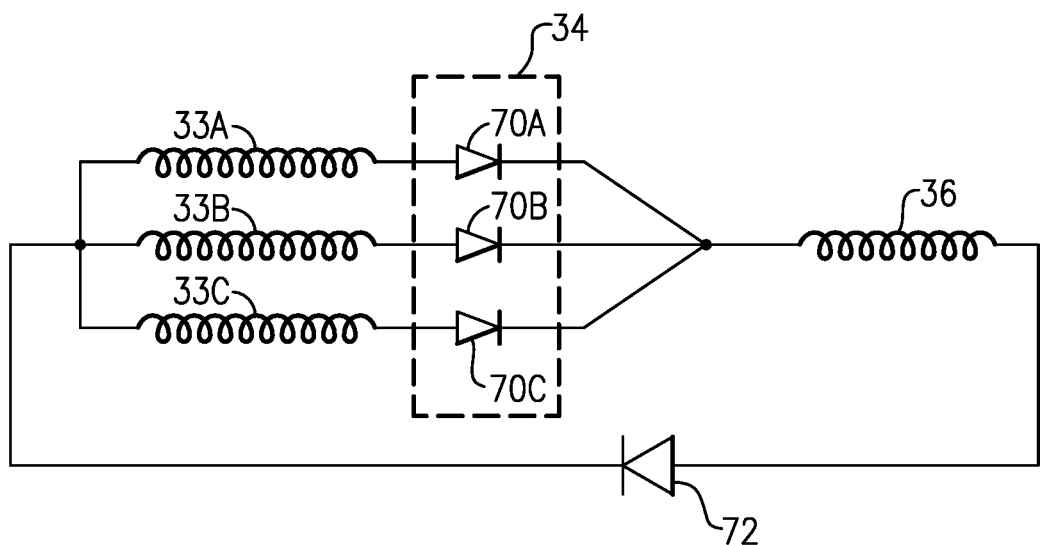
FIG. 5 is a schematic view of an example rectifier for the electromagnetic clutch assembly of FIG. 3.

FIG. 5 is a schematic view of an example implementation of the rectifier 34. In the example of FIG. 5, the at least one inductive winding 33 includes a plurality of inductive windings 33A-C, each corresponding to a phase of electrical current, and the rectifier 34 includes a respective diode 70A-C that rectifies current from its respective inductive winding 33A-C. A return diode 72 is also included.

Figure 6:
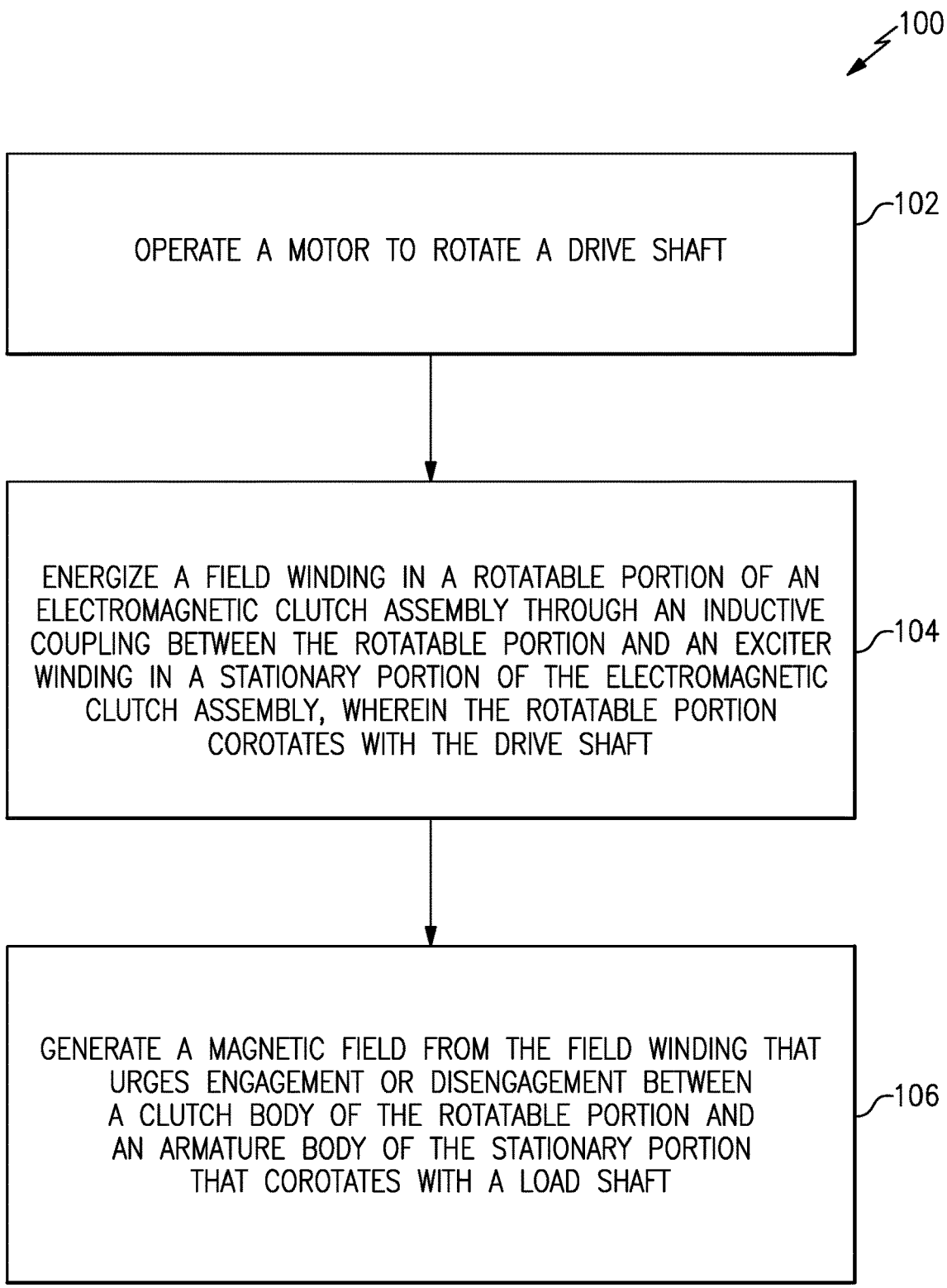
FIG. 6 is a flowchart representative of an example method of operating an electromagnetic actuator.

FIG. 6 is a flowchart 100 representative of an example method of operating an electromagnetic actuator 16. The method includes operating a motor to rotate a drive shaft 22 (block 102). A field winding 36 in a rotatable portion of an electromagnetic clutch assembly 18 is energized through an inductive coupling between the rotatable portion and an exciter winding 40 in a stationary portion of the electromagnetic clutch assembly 18 (block 104). A magnetic field is generated from the field winding 36 that urges engagement or disengagement between clutch body 35 of the rotatable portion and armature body 50 of the stationary portion which corotates with the load shaft 24 (block 106).

In one example, energizing the field winding 36 (block 104) includes inducing current in the inductive winding 33 of the rotatable portion, rectifying the induced current using rectifier 34, and providing the rectified current to the field winding 36. In another example, the rectifier 34 and inductive winding 33 are omitted, and the exciter winding 40 induces current in the field winding 36.

Although FIG. 3 illustrates the clutch body 35 as being axially stationary while the armature body 50 is movable along the central longitudinal axis A, in another example the clutch body 35 is axially movable along the central longitudinal axis A in addition to or as an alternative to the armature body 50 being axially movable.

The electromagnetic clutch assembly 18 discussed herein avoids the brushed configuration of prior art electromagnetic clutches, and therefore improves reliability. The electromagnetic clutch assembly 18 also expands potential uses for electronic actuators to certain aerospace applications, for which the reliability of traditional electromagnetic clutches that use contact brushes would not be sufficient.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. An electromagnetic actuator comprising:
a drive shaft;
a motor operable to rotate the drive shaft;
a load shaft coupled to an armature body;
a clutch operable to control whether the drive shaft engages the load shaft, the clutch comprising:
  a rotatable portion that corotates with the drive shaft and comprises a field winding and a clutch body; and
  a stationary portion comprising an exciter winding that is inductively coupled to the rotatable portion and is operable to energize the field winding;
  wherein the field winding is operable, when energized, to provide a magnetic field that causes engagement or disengagement between the clutch body and an armature body;
a first sensor configured to determine an angular position of the drive shaft and provide feedback indicative of the angular position of the drive shaft; and
a controller operable to control at least one of operation of the motor and energizing of the exciter winding based on the feedback from the first sensor.

2. The electromagnetic actuator of claim 1, wherein the rotatable portion comprises an inductive winding and a rectifier that connects the inductive winding to the field winding, the exciter winding configured to induce alternating current (AC) in the inductive winding, and the rectifier configured to rectify the AC to direct current (DC) provided to the field winding.

3. The electromagnetic actuator of claim 2, wherein:
the stationary portion comprises a clutch housing;
the rotatable portion is at least partially disposed within the clutch housing; and
the exciter winding comprises leads that connect to a power source outside of the clutch housing, such that the exciter winding receives current from the power source and induces current in the inductive winding in a brushless configuration.

4. The electromagnetic actuator of claim 1, comprising:
at least one spring that provides a bias force that biases the armature body away from the clutch body;
wherein the magnetic field resists said bias force and causes the armature body to engage the clutch body.

5. The electromagnetic actuator of claim 1, wherein the clutch body comprises a plurality of teeth operable to engage teeth of the armature body.

6. The electromagnetic actuator of claim 1, wherein at least one of the clutch body and armature body comprises a high friction surface for engagement between the clutch body and the armature body.

7. The electromagnetic actuator of claim 1, wherein the rotatable portion is rotatable about a longitudinal axis, and the armature body is movable along the longitudinal axis to engage or disengage from the clutch body.

8. The electromagnetic actuator of claim 1, comprising:
a proximity sensor configured to measure axial displacement of the armature body along the longitudinal axis and provide feedback indicative of the measured axial displacement; and
the controller is operable to verify whether the clutch body and armature body are engaged or disengaged based on the feedback from the proximity sensor.

9. The electromagnetic actuator of claim 1, comprising a second sensor configured to determine an angular position of the load shaft and provide feedback indicative of the angular position of the load shaft, wherein the controller is configured to control energizing of the exciter winding based on the feedback from the second sensor.

10. The electromagnetic actuator of claim 1, wherein:
the drive shaft comprises a first and second portions that are coaxial and rotate about a common axis; and
the first and second portions are connected through a gear set.

11. A method of operating an electromagnetic actuator comprising:
operating a motor to rotate a drive shaft;
energizing a field winding in a rotatable portion of an electromagnetic clutch assembly through an inductive coupling between the rotatable portion and an exciter winding in a stationary portion of the electromagnetic clutch assembly, wherein the rotatable portion corotates with the drive shaft;
generating a magnetic field from the field winding that urges engagement or disengagement between a clutch body of the rotatable portion and an armature body of the stationary portion that corotates with a load shaft;
detecting an angular position of the drive shaft using a first sensor; and
performing said operating the motor based on the detected angular position.

12. The method of claim 11, wherein said energizing the field winding comprises inducing current in an inductive winding of the rotatable portion, rectifying the induced current, and providing the rectified current to the field winding.

13. The method of claim 12, wherein the exciter winding receives current from a power source and induces current in the inductive winding in a brushless configuration.

14. The method of claim 11, comprising:
providing a bias force from at least one spring that biases the armature body away from or towards the clutch body; and
utilizing the magnetic field to resist the bias force.

15. The method of claim 11, comprising:

detecting an angular position of the load shaft using a sensor; and performing said energizing based on the detected angular position.

16. An electromagnetic actuator comprising:

a drive shaft;

a motor operable to rotate the drive shaft;

a load shaft coupled to an armature body; and a clutch operable to control whether the drive shaft engages the load shaft, the clutch comprising:

a rotatable portion having an inductive winding and a field winding; and a stationary portion having an exciter winding configured such that during rotation of the rotatable portion when electrical power is supplied to the exciter winding, electrical power is induced in the inductive winding and transferred to the field winding to generate a magnetic field to urge engagement or disengagement between the rotatable portion and the stationary portion;

a sensor configured to determine an angular position of the drive shaft and provide feedback indicative of the angular position; and a controller operable to control at least one of operation of the motor and energizing of the exciter winding based on the feedback.

\* \* \* \* \*